United States Patent [19]

Bogan

[11] 4,187,561
[45] Feb. 12, 1980

[54] TOILET RISER

[76] Inventor: David B. Bogan, 7303 Paso Robles Ave., Van Nuys, Calif. 91406

[21] Appl. No.: 931,184

[22] Filed: Aug. 4, 1978

[51] Int. Cl.² .............................................. A47K 11/02
[52] U.S. Cl. ........................................................... 4/116
[58] Field of Search ................ 4/116, 112, 315, 132, 4/133; 110/9 R

[56] References Cited

U.S. PATENT DOCUMENTS

| 3,389,826 | 6/1968 | Wall | 4/116 |
| 3,435,464 | 4/1969 | Harding | 4/116 |
| 3,675,250 | 7/1972 | Bengtsson | 4/116 |

Primary Examiner—Lenard A. Footland
Attorney, Agent, or Firm—Roger A. Marrs

[57] ABSTRACT

A toilet riser is disclosed herein and composed of a high strength to weight ratio material which includes a substantially oval shaped body having an annular sidewall base portion and an upwardly sidewall tapered portion. The upper and lower sidewall portions are joined by an integral stiffener which encircles the entire body of the riser. The opposite sides of the lower or base sidewall portion of the body includes vertical stiffening segments and the upper sidewall portion terminates in an opening defined by a substantially circular lip. A toilet seat and lid are hingeably carried on a support section integrally formed with the lip and the upper body sidewall portion. A splash panel or plate is integrally formed in the body immediately below the toilet seat and lid mounting portion.

2 Claims, 4 Drawing Figures

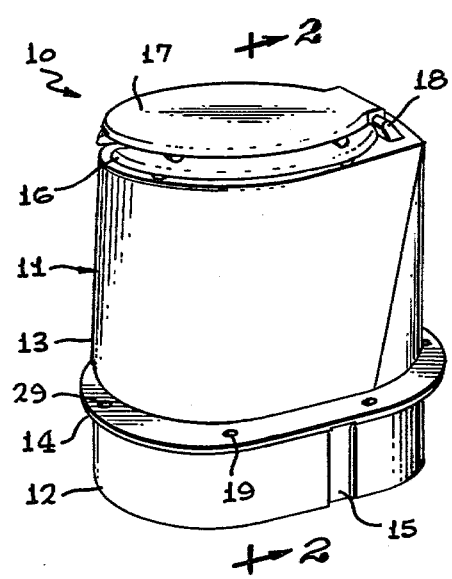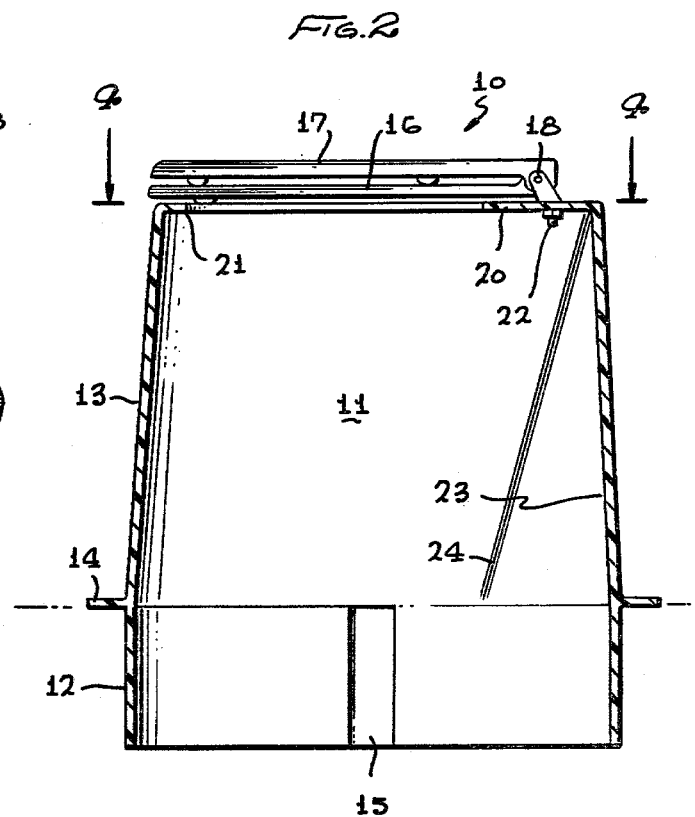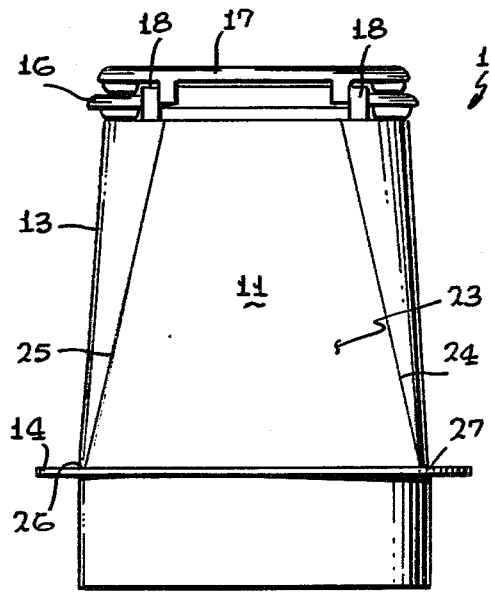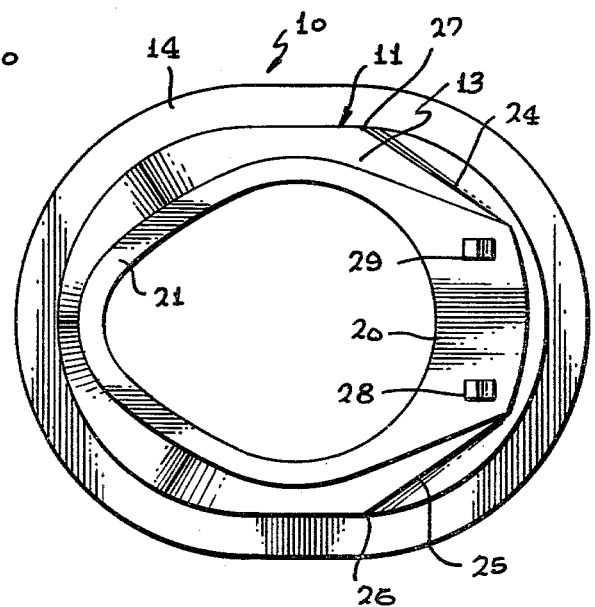

TOILET RISER

BACKGROUND OF THE INVENTION

1. Field of the Invention

This invention relates to toilet risers and more particularly to a novel toilet riser which is virtually indestructable through its use of cross-linked polyethylene material and integral stiffening derived in manufacture from seamless molding techniques.

2. Brief Description of the Prior Art

In the past, toilet risers have been used in public campgrounds which were composed of stainless steel and which incorporated a conventional lid and toilet seat thereon. During the course of use, the stainless steel construction is subjected to vandalization, and the toilet risers are substantially bent, torn, ripped, and otherwise damaged. In some instances, the stainless steel construction comprises certain welds or riveted seams which cannot withstand abnormal punishment directed thereto by members of the general public. Furthermore, even though the highest stainless steel quality of material is used, rust and other impurities tend to weaken the structure and therefore, yearly maintenance and repair programs must be initiated to insure proper operation and usage of the toilet riser.

Therefore, a long standing need has existed to provide a toilet riser which is virtually indestructible and which may be readily installed and used without extensive maintenance. Also, the riser should be easily cleaned and one which will not support bacteria and which will be impervious to chemicals which would otherwise produce staining, etching and other damage.

SUMMARY OF THE INVENTION

Accordingly, the above problems and difficulties have been obviated by the present invention which provides a novel toilet riser having a substantially oval body in horizontal cross section which comprises a base sidewall portion and an upright portion which tapers from an integral joint with the base portion. The joint is further provided with an integral stiffening rib which encompasses the riser body. An opening is provided at the top of the body which is defined by a circular lip. A toilet seat and lid is hingeably carried on a support portion of the body adjacent the rear wall portion thereof. Preferably, the toilet riser is composed of cross-linked polyethylene and is of an integral construction so as to avoid seams or other joints.

Therefore, it is among the primary objects of the present invention to provide a novel toilet riser which is composed of material adapted to resist severe abuse and which may be readily handled and stored.

Another object of the present invention is to provide a novel toilet riser which is impervious to chemicals and that may be readily cleaned employing conventional cleansers.

Still a further object of the present invention is to provide a novel toilet riser of integral or one-piece construction which is reinforced with integral ribs and flanges so that a high strength to weight ratio is obtained.

Still a further object of the present invention is to provide a novel toilet riser which is composed of cross-linked polyethelene employing seamless molding techniques so as to provide a tough, resistant and inexpensive toilet riser offering resistance to damage to use or abuse and which is ultra-lightweight.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in connection with the accompanying drawings in which:

FIG. 1 is a prospective view of the novel toilet riser of the present invention;

FIG. 2 is a longitudinal cross sectional view of the toilet riser shown in FIG. 1 as taken in the direction of arrows 2—2 thereof;

FIG. 3 is a rear elevational view of the toilet riser; and

FIG. 4 is a transverse cross sectional view of the toilet riser shown in FIG. 2 as taken in the direction of arrows 4—4 thereof.

DrSCRIPTION OF PREFERRED EMBODIMENT

Referring to FIG. 1, the novel toilet riser of the present invention is illustrated in the general direction of arrow 10. The toilet riser includes an oval shaped body 11 which includes a substantially straight sidewall base or lower portion 12 which is integrally formed with an upwardly tapering upper sidewall portion 13. At the juncture of the lower and upper portions 12 and 13, an integrally formed rib or flange 14 is provided which not only serves as a stiffener for the entire structure but may be employed as a mounting flange so that the riser may be installed on an existing floor structure. The base portion 12 includes a recessed section 15 on opposite sides of the body 11 which serve as stiffeners therefore so as to reinforce the sides of the base portion and may also be employed for receiving structure on the floor supporting the riser.

FIG. 1 further illustrates a toilet seat 16 and a lid 17 which are carried on a hinge element 18 supported on a support portion of the body 11 as identified by numeral 20.

Referring now in detail to FIG. 2, it can be seen that the upper portion 13 of the body 11 includes a circular lip 12 which defines an opening leading into the interior of the riser 11. The support section 20 is integrally formed with the lip 21 so that it is reinforced thereby. The hinge element 18 may be suitably attached to the support portion 20 by any means such as conventional bolt and nut arrangement as indicated by numeral 22. In this view, attention is directed to the fact that the upper portion 13 is tapered in an upwardly direction while the base portion 12 is substantially straight in a vertical plane. Also, the upper and base portions 13 and 12 respectively are integrally formed with the outwardly extending flange 14 which reinforces the entire body of the riser. The interior of the riser is formed with an elongated flat panel 23 which serves as a splash panel and slopes downwardly from the support portion 20 to the juncture of the flange 14 upper sidewall portion 13 and base sidewall portion 12. The panel 23 is defined on its opposite sides by a line of demarcation indicated by numerals 24 and 25 in FIG. 3.

Referring now to FIG. 3, it can be seen that the lines of demarcation 24 and 25 downwardly slope from the support portion 20 and terminate respectively at the opposite sides of the body 11 at points 26 and 27 respectively.

Referring now to FIG. 4, it can be seen that the lip 21 defines an opening leading into the interior of the body 11. It can also be seen that the stiffening flange 14 completely encircles the body 11 and that the upper body portion 13 is tapered from the flange 14 to the lip 21. The support area 20 may include reinforced areas 28 and 29 respectively for supporting the hinge elements 18, and the flange 14 may be drilled to provide holes 19 for receiving bolts or the like for securing the riser to a floor.

In view of the foregoing, it can be seen that the toilet riser of the present invention provides a virtually indestructible unit which will resist severe use. The construction is integral by employing seamless molding techniques using tough, proven cross-linked polyethylene material so as to insure that the riser will perform to the rigorous demands placed upon it in service. The riser is ultra-lightweight which results in cost saving with lower transportation expenses and is easily handled and stored. The riser is impervious to chemicals which resist staining, etching and other damage to the construction. The riser is easily cleaned and requires only general use cleaners. Bacteria is not supported on the sidewalls since the composition of the material inherently resists bacteria and promotes easy cleansing since the surfaces are smooth. No joints or seams are employed as the unit is molded in one piece for strength.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A toilet riser comprising:

an open-ended, hollow body of integral, unitary construction;

said body having a straight walled base or lower portion and a tapered walled upper portion;

an outwardly projecting flange integrally provided at the juncture of said lower and said upper portion;

an inwardly extending lip integrally formed at the termination end of said upper portion defining a central opening leading into the hollow interior of said body;

side wall reinforcement means vertically provided on opposite sides of said lower portion;

a splash panel integrally formed beneath said lip at the rear of said upper portion;

said body is characterized as being fabricated by seamless molded techniques and the composition of said body is cross-linked polyethylene; and said body includes a hinge support portion integrally formed with and adjacent to said lip at the rear of said body.

2. The invention as defined in claim 1 including:

a hinged seat and lid operably carried on said support portion.

* * * * *